United States Patent Office 3,711,482
Patented Jan. 16, 1973

---

3,711,482
2-ACETYL-3-ETHYLPYRAZINE AND PROCESS FOR THE PREPARATION THEREOF
Braja D. Mookherjee, Matawan, Christopher Giacino, Califon, Elizabeth A. Karoll, Old Bridge, and Manfred H. Vock, West Orange, N.J., assignors to International Flavors & Fragrances, New York, N.Y.
No Drawing. Filed Aug. 3, 1970, Ser. No. 60,740
Int. Cl. C07d 51/76
U.S. Cl. 260—250 R            7 Claims

ABSTRACT OF THE DISCLOSURE 2-acetyl-3-ethylpyrazine; processes for altering the flavor of consumable materials, particularly foodstuffs, which comprise adding such pyrazine to the material; the products so produced; flavoring and fragrance compositions utilizing such pyrazine; and processes for producing such pyrazine.

BACKGROUND OF THE INVENTION

This invention relates to a novel pyrazine material, compositions containing such material, and to processes for producing and using such pyrazine.

In processing potatoes and potato-containing products, as by canning or drying, to preserve them, the original natural flavor is frequently changed in character, weakened, or destroyed and objectionable aromas and flavors develop as storage life is increased. This results in a product which does not have all of the organoleptic properties which are normally associated with fresh potatoes or with products prepared from fresh potatoes. It has been found that even the best and most expensive of processes for preserving potatoes by themselves and in products containing them result in a considerable loss of the natural flavor.

Two of the forms in which the white, or Irish, potato is frequently preserved are as spray-dried granules and drum-dried flakes. Both of these processes when properly performed preserve in large measure the original potato texture, so that mashed potatoes can be made from these products merely by reconstituting with milk or water. There is still, however, a significant and delectable loss of original potato flavor. Some work has been done to augment the flavor of such dehydrated potatoes by the addition of solubles or extracts obtained from the peel, but such flavoring materials have not been entirely successful. Even if the process of treating potato peels were entirely successful in producing a satisfactory potato flavoring material, the peels would be difficult to handle and the solubles difficult to extract so that the product accordingly would be costly.

The use of various pyrazine derivatives has recently been suggested for the preparation of flavoring materials, and a wide variety of bicyclic pyrazines, pyrazine ethers, and alkylpyrazines has been used. The use of certain acetylpyrazines and acetylmethylpyrazines for producing popcorn flavors has also been suggested.

THE INVENTION

It has now been discovered that a novel pyrazine, 2-acetyl-3-ethylpyrazine, having the formula

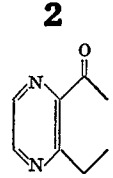

has a strong raw or cooked potato aroma and fragrance when utilized as hereinafter described. This invention accordingly contemplates the novel pyrazine, processes for altering the flavor of consumable materials with such pyrazine to provide potato or potato-like flavor and aroma qualities; flavoring and flavor-enhancing compositions utilizing such pyrazine; and processes for producing the pyrazine.

While pyrazines which are closely related chemically to the acetylethylpyrazine are known to have popcorn flavors, such prior materials do not have any substantial raw or vegetable character and are wholly unsuited for use in producing potato-flavored compositions.

This novel pyrazine can be produced by the reaction of a 2,3-diethylpyrazine with N-halosuccinimide to form 2-(1-haloethyl)-3-ethylpyrazine and then treating the halogenated derivative with an alkali metal and 2-nitropropane. It has been found that the reaction is a general one which can be utilized to produce 2-acetyl-3-alkylpyrazines by utilizing 2-ethyl-3-alkylpyrazine as the starting material. The alkyl group is desirably a lower alkyl group such as one having from one to six carbon atoms in the molecule, and the alkyl group preferably contains one or two carbon atoms.

The chloro-, bromo-, and iodosuccinimides are desirably used, and the bromosuccinimide is preferred in certain aspects of the invention. Lithium and sodium are desirably used as the alkali metal and sodium is preferred.

The first step of the reaction is carried out by admixing the halosuccinimide and the ethylalkylpyrazine. The reactants are preferably raised to a temperature of from 25° to 85° C. Lower temperatures cause the reaction to take place very slowly, while temperatures substantially above this result in an unduly rapid reaction. While one reactant or the other can be in exces, it has generally been found that stoichiometric quantities of the two reactants give the best yields and permit ready control of the reaction.

This step of the reaction is desirably carried out in an inert reaction vehicle. Preferred vehicles include halogenated hydrocarbons such as carbon tetrachloride, chloroform, methylene chloride, and the like. When the inert vehicle is chosen to have a boiling range in the temperature range of the reaction, the temperature is readily controlled by refluxing the reaction mixture.

The times required for the reaction will vary inversely with the temperature. Thus, times of from 30 minutes to about four hours can be used. In order to issue good completeness of the reaction and to avoid unwanted side reactions, times of from one to two hours are preferred.

It is further desirable to have a catalyst present during the reaction. The catalyst can be a strong oxidizing agent, for example a peroxide such as benzoyl peroxide, acetyl peroxide, and the like, or alternatively, radiation such as ultraviolet light can be used. Generally, the catalyst is desirably present in amounts of from about 0.1 to about 5 percent, based on the halosuccinimide.

The halo derivative so produced is then reacted with a mixture of the alkali metal and 2-nitropropane. The ratio of reactants with respect to the halo derivative should be at least stoichiometric, and the molar quantity of alkali metal is preferably in excess of the halo derivative, while the nitropropane is desirably in molar excess of the alkali metal. A preferred ratio of halo derivative to alkali metal to nitropropane is 1:1.2:1.4.

The reaction is desirably carried out in a vehicle. The vehicle can be a solvent such as a lower alkanol. Thus, ethanol and the like are useful vehicles. The temperatures used are from 25° to 80° C. and the time is from one hour to about four hours.

Acylalkylpyrazines, especially the acetylethylpyrazine of this invention, can also be prepared by reaction of a 2,3-dialkylpyrazine with an oxidizing agent to produce the N-oxide, treatment of the N-oxide with acetic anhydride to produce the 2-(1-acetoxyalkyl)-3-alkyl derivative, hydrolysis of the acetoxy material with a strong base to produce the corresponding alcohol, 2-(1-hydroxyalkyl)-3-alkylpyrazine, and oxidation of the alcohol to the corresponding ketone. The process is particularly adapted to use with 2,3-diethylpyrazine as the starting material.

Production of the N-oxide from the starting material is carried out by treatment with a peroxy compound, desirably an organic peroxy acid such as performic, peracetic, perpropionic, and the like. Peracetic acid is a preferred oxidizing agent in the preparation of the N-oxide. This reaction is preferably carried out in a reaction vehicle, desirably an organic acid such as acetic acid and the like.

The N-oxide production is carried out at a temperature of from 60° to 90° C., and it is desirably carried out at from 70° to 80° C. The oxidizing agent should be added slowly, preferably in a stoichiometric or slightly greater amount, so that the reaction can be readily controlled. The reaction is desirably carried out for from one to four hours, and longer times in this range provide better yields of the N-oxide in some aspects of the process.

The N-oxide is then converted to the acetoxy derivative by treatment with acetic anhydride. The anhydride is added after removal of the acidic reaction vehicle from the N-oxide. The quantity of anhydride used should be in excess of the stoichiometric quantity, and it is desirable to use from two to ten times the molar quantity, based on the N-oxide, since the excess anhydride serves to provide a reaction vehicle and permits easier control of the reaction.

The reaction with anhydride is carried out at temperatures on the order of from 120° to 165° C., and the reaction is preferably carried out at the reflux temperature of the anhydride-containing mixture. Under these conditions good yields are obtained in from three to eight hours, and times from about five to six hours are preferred. After the acetoxy derivative is prepared, the remaining anhydride is stripped off under vacuum.

The acetoxy derivative is converted to the corresponding alcohol by hydrolysis with a strong base, desirably an aqueous alkali metal hydroxide such as sodium or potassium hydroxide. The hydrolysis can be carried out at from 15° to 40° C., and ordinary room temperatures of 20-25° C. are preferred. Aqueous solutions containing from 15 to 30 percent hydroxide are desirable.

The hydrolysis is desirably carried out in the presence of an alcohol, desirably a lower alkanol such as methanol, ethanol, and the like. Methanol is a preferred material in certain aspects of this process. The time utilized for the reaction can vary from about 30 minutes to about four hours. Good results are obtained when the hydrolysis is carried out for from two to three hours at room temperature.

The 1-hydroxyalkyl material is converted to the corresponding ketone (the acyl derivative) by treatment with an anhydride, preferably acetic anhydride, in the presence of a dimethyl sulfoxide vehicle. The reaction is carried out at a temperature of from 20° to 40° C., desirably at room temperatures of from 22°-25° C., for 12 to 36 hours. Good results have been obtained with preferred times on the order of about 24 hours. The quantities of dimethyl sulfoxide and of acetic anhydride used are in molar excess from two to about ten times the quantity of the alcohol.

Any of the foregoing reactions can be carried out at pressures above or below normal atmospheric pressure. Generally, it is preferred to utilize atmospheric pressure.

Alkyl, as used herein, means lower alkyl, desirably an alkyl group containing from two to five carbon atoms. A preferred alkyl is ethyl.

It will be understood according to the present invention that the intermediate and the final products prepared herein can be neutralized, washed, and dried to purify and cleanse the desired substances. The pyrazine product can be obtained in purer form or in substantially pure form by conventional purification techniques. Thus, the intermediate and the product can be purified and/or isolated by distillation, extraction, crystallization, filtration, preparative chromatographic techniques, and the like. It has been found desirable to purify the pyrazine by fractional distillation under vacuum.

It will be appreciated from the present invention that the 2-acetyl-3-ethylpyrazine according to the present invention can be used to alter, vary, fortify, modify, enhance, or otherwise improve the flavor of a wide variety of materials which are ingested, consumed, or otherwise organoleptically sensed.

The term "alter" in its various forms will be understood herein to mean the supplying or imparting a flavor character or note to an otherwise bland, relatively tasteless substance, or augmenting an existing flavor characteristic where the natural flavor is deficient in some regard, or supplementing the existing flavor impression to modify organoleptic character.

This pyrazine is accordingly useful in flavoring compositions. A flavoring composition is taken to mean one which contributes a part of the overall flavor impression by supplementing or fortifying a natural or artificial flavor in a material as well as one which supplied substantially all the flavor and/or aroma character to a consumable article.

The term "foodstuff" as used herein includes both solid and liquid ingestible materials for man or animals, which materials usually do, but need not, have nutritional value. Thus, foodstuffs includes meats, gravies, soups, convenience foods, malt, alcoholic, and other beverages, milk and dairy products, seafoods including fish, crustaceans, mollusks, and the like, candies, vegetables, cereals, soft drinks, snacks, dog and cat foods, other veterinary products, and the like. It will be understood by those skilled in the art that the acetylethylpyrazine can be used to impart potato flavor notes to foodstuffs as aforementioned whenever such notes are desired.

When the acetylethylpyrazine of this invention is used in a flavoring composition, it can be combined with conventional flavoring materials or adjuvants. Such coingredients or flavoring adjuvants are well known in the art for such use and have been extensively described in the literature. Apart from the requirement that any such adjuvant material be ingestibly acceptable, and thus non-toxic or otherwise non-deleterious, conventional materials can be used and broadly include other flavor materials, vehicles, stabilizers, thickeners, surface active agents, conditioners and flavor intensifiers.

Such conventional flavoring materials include saturated, and amino acids; alcohols, including primary and secondary alcohols; esters; carbonyl compounds including ketones and aldehydes; lactones; other cyclic organic materials including benzene derivatives, alicyclics, heterocyclics such as furans, pyridines, other pyrazines and the like or derivatives thereof; sulfur-containing materials including thiols, sulfides, disulfides and the like; proteins; lipids; carbohydrates; so-called flavor potentiators such as monosodium glutamate, guanylates, and inosinates; natural flavoring materials; essential oils and extracts; artificial flavoring materials; and the like.

More particularly, potato flavors can be considered to comprise three basic flavor notes which can be classified as sulfur, burnt, and green. The sulfur flavor notes can be provided by materials such as methional and the like; the burnt note, by the acetylethylpyrazine of this invention; and the green note, by 2-hexen-1-ol. The proportions of these three notes are most preferably 1:1:0.25. Accordingly, it is preferred in the preparation of potato flavoring compositions, that methional and the like and 2-hexen-1-ol and the like be used in conjunction with the acetylethylpyrazine. The proportion of methional used is about the same as that of the pyrazine, while the hexenol is used in about one-quarter the amount of the pyrazine.

Stabilizers include preservatives such as sodium chloride, and the like, antioxidants such as calcium and sodium ascorbate, ascorbic acid, butylated hydroxyanisole, butylated hydroxytoluene, propyl gallate, and the like, sequestrants such as citric acid, ethylenediamine tetracetic acid, phosphates, and the like.

Thickeners include materials such as carriers, binders, protective colloids, suspending agents, emulsifiers and the like, such as agar-agar, carrageenan, cellulose and cellulose derivatives such as carboxymethyl cellulose and methyl cellulose, natural and synthetic gums such as gum arabic, gum tragacanth and the like, and other proteinaceous materials, lipids, carbohydrates, starches, and pectins.

Surface active agents include emulsifying agents such as mono- and/or diglycerides of fatty acids such as capric acid, capryllic acid, palmitic acid, stearic acid, oleic acid, myristic acid, and the like, lecithin, defoaming and flavor-dispersing agents such as sorbitan monostearate, potassium stearate, hydrogenated tallow alcohol, and the like.

Conditioners include compounds such as bleaching and maturing agents such as benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents such as sodium acetate, ammonium bicarbonate, ammonium phosphate, citric acid, lactic acid, vinegar and the like; colorants such as carminic acid, cochineal, turmeric, curcunin and the like; firming agents such as aluminum sodium sulfate, calcium chloride and calcium gluconate; texturizers; anti-caking agents such as aluminum calcium sulfate and tribasic calcium phosphate; enzymes; yeast foods such as calcium lactate and calcium sulfate; nutrient supplements such as iron salts such as ferric phosphate, ferric pyrophosphate, ferrous gluconate and the like, riboflavin, vitamins, zinc sources such as zinc chloride, zinc sulfate, and the like.

The acetylethylpyrazine or the compositions incorporating it, as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenen, other gums, and the like. The pyrazine can be incorporated with the carriers by conventional means such as spray-drying, drum-drying, and the like. Such carriers can also include materials for coacervating the pyrazine (and other flavoring ingredients, as present) to provide encapsulated products. When the carrier is an emulsion, the flavoring composition can also contain emulsifiers such as mono- and diglycerides of fatty acids and the like. With these carriers or vehicles the desired physical form of the composition can be prepared.

It will be understood by those skilled in the art that the acetylethylpyrazine can be added to the materials to be flavored at any convenient point in the production of the finished product. Thus, when the pyrazine is used to alter or otherwise vary the flavor of a foodstuff, it can be added in the original mixture, dough, emulsion, batter, natural potato product, or the like prior to any cooking or heating operation. Alternatively, it can be added at a later stage of processing if volatilization losses would be excessive during the earlier processing. The quantity of pyrazine utilized should be sufficient to impart the desired raw or roasted potato flavor characteristic to the product, but on the other hand, the use of an excessive amount of the pyrazine is not only wasteful and uneconomical, but too large a quantity unbalances the flavor of the product consumed. Moreover, at too high a level in flavoring compositions (and also in foodstuffs) the potato character of the acetylethylpyrazine will be lost. The quantity used will vary depending upon the ultimate foodstuff, or other consumable product; the amount and type of flavor initially present in the product; the further process or treatment steps to which the product will be subjected; regional and other preference factors; the type of storage, if any, to which the product will be subjected; and the pre-consumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff, tobacco, or other consumable material.

It is accordingly highly desirable that the ultimate compositions contain from about 0.005 part per million (p.p.m.) to about 20 p.p.m. of the pyrazine. More particularly, in food compositions it is preferred to use from about 0.010 to about 1 p.p.m. All parts, proportions, percentages, and ratios herein are by weight unless otherwise indicated.

The amount of pyrazine to be utilized in flavoring compositions can be varied over a wide range depending upon a particular quality to be added to the foodstuff or other consumable material. Thus, amounts of the pyrazine according to the present invention from about 0.1 percent up to 80 or 90 percent can be incorporated in such compositions It is generally found to be desirable to include from about 0.5 to about 25% of the pyrazine in such compositions.

The acetylethylpyrazine of this invention is also useful as an olfactory agent. Surprisingly, its potato aroma notes suit it for formulation into, or for use as a component of, a "perfume composition."

The term "perfume composition" is used herein to mean a mixture of organic compounds, including, for example, alcohols, aldehydes, ketones, nitriles, esters, and frequently hydrocarbons which are admixed so that the combined odors of the individual components produce a pleasant or desired fragrance. Such perfume compositions usually contain: (a) the main note or the "bouquet" or foundationstone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling fresh smelling materials.

In perfume compositions the individual component will contribute its particular olfactory characteristics, but the overall effect of the perfume composition will be the sum of the effect of each ingredient. Thus, the pyrazine of this invention can be used to alter the aroma characteristics of a perfume composition, for example, by high-lighting or moderating the olfactory reaction contributed by another ingredient in the composition.

The amount of the compound of this invention which will be effective in perfume compositions depends on many factors, including the other ingredients, their amounts and the effects which are desired. It has been found that perfume compositions containing as little as 2% of the compounds of this invention, or even less, can be used to impart a scent to soaps, cosmetics, and the other products. The amount employed can range up to 50% or higher and will depend on considerations of cost, nature of the end product, the effect desired on the finished product and the particular fragrance sought.

The pyrazine of this invention can be used alone or in a perfume composition as an olfactory component in detergents and soaps; space odorants and deodorants; perfumes; colognes; toilet waters; bath preparations such as bath oil and bath salts; hair preparations such as lacquers, brilliantines, pomades, and shampoos; cosmetic preparations such as creams, deodorants, hand lotions, and sun screens; powders such as talcs, dusting powders, face powder, and the like. When used as an olfactory component of a perfumed article, as little as 0.01% of the acetylethylpyrazine will suffice to improve the odor. Generally, no more than 0.3% is required.

In addition, the perfume composition or fragrance composition can contain a vehicle or carrier for the pyrazine alone or with other ingredients. The vehicle can be a liquid such as alcohol, glycol, or the like. The carrier can be an absorbent solid such as a gum or components for encapsulating the composition.

It will be appreciated that the pyrazine according to this invention can be used to alter, enhance, modify, vary, or supplement the fragrance properties of natural or synthetic fragrance compositions. Thus, such pyrazine can be used in fragrance compositions for addition to perfume compositions or directly to products such as soap, detergents, cosmetics, and the like. The fragrance compositions so prepared do not entirely provide the olfactory properties to the finished perfume or other article, but they do furnish a substantial part of the overall fragrance composition.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of 2-acetyl-3-ethylpyrazine

A two-liter flask is charged with 68.1 g. (0.5 mol) of 2,3-diethylpyrazine, 89.0 g. (0.5 mol) of N-bromosuccinimide, 1000 cc. of carbon tetrachloride, and 1.0 g. of benzoyl peroxide, and the flask contents are then stirred and heated to reflux temperature of 75°–80° C. for 1¼ hours. The flask contents are then cooled, the solids are removed by filtration, and the carbon tetrachloride is removed under vacuum to provide 2-(1-bromoethyl)-3-ethylpyrazine.

A one-liter reaction flask is charged with 500 cc. of dry ethanol, and 12.7 g. of sodium is dissolved in the ethanol. After dissolution of the sodium, 62.3 g. of 2-nitropropane is added, and a thick white semi-solid forms. The reaction mass is then stirred for ½ hour. After the stirring is completed, the bromine derivative prepared above is added and the reaction mass becomes much thicker and assumes the consistency of a thick paste.

The paste-like mass is then heated to reflux. After one-half hour of reflux the mass becomes thin and assumes a dark grey to brown color. After an additional one-half hour of reflux, the reaction mass is then permitted to cool to room temperature.

The cooled mass is filtered over vacuum to remove solids, the filtrate is concentrated under vacuum, the concentrate is dissolved in diethyl ether, and the ether solution is filtered under vacuum to remove solids. The filtrate is concentrated under vacuum, and the concentrate so obtained is combined with 25 g. of Primol mineral oil and strip-distilled to obtain 56.3 g. of material boiling at 58–72° C. under 1.5 mm. Hg. The strip-distilled product is then re-distilled to obtain 34.14 g. of 2-acetyl-3-ethylpyrazine product boiling at 55° C. under 1.2 mm. Hg.

A 0.0001 percent solution of this acetylethylpyrazine in 95 percent ethanol is evaluated for odor on a blotter strip, and is found to have a characteristic raw potato odor. This is about the threshold level for the odor of the pyrazine of the present invention. At the 0.001 percent level in ethanol on a blotter strip, the material has a raw potato aroma.

The taste of the pyrazine is evaluated in water, and the threshold level is found to be 0.010 p.p.m. At 0.020 p.p.m. the pyrazine confers a raw potato taste with a light roasted note to the aqeuous solution; at 0.050 p.p.m., a more baked potato character dominating; at 0.2 p.p.m., a strong potato taste; and at 1 p.p.m., a strong raw/baked potato, roasted, earthy taste. The pyrazine is evaluated at 0.2 p.p.m. in salt water and found to have a raw potato note dominating. At 0.2 p.p.m. in sugar water the material has a potato note dominating over nut.

The material is added to a commercially available chicken soup at the level of 0.010 p.p.m. and is found to confer a fresher, improved taste to the soup. When this addition is repeated at the 0.050 p.p.m. level, the chicken flavor character of the soup begins to assume a potato flavor. The pyrazine is added to a commercially available potato dumpling mix at the level of 0.02 p.p.m., and the potato flavor character of the dumplings is considerably improved.

EXAMPLE II

Preparation of 2-acetyl-3-ethylpyrazine

A solution of 27.6 g. (0.2 M) of 2,3-diethylpyrazine in 100 cc. of acetic acid is charged to a 500 cc. reaction flask fitted with a stirrer, thermometer, reflux condenser, and additional funnel. The flask contents are heated to 75° C. and 38.0 g. (0.2 M) of 40 percent peracetic acid is added dropwise during 20 minutes. The color, initially amber, changes to a clear yellow.

The reaction mixture is stirred at 70–80° C. for an additional 60 minutes, and the acetic acid is recovered under reduced pressure to obtain about 38.0 g. of a yellow oil. The yellow oil is then refluxed with 150 cc. of acetic anhydride for four hours. The excess acetic anhydride is recovered under vacuum, and the residue is treated with ether to provide 29.5 g. of ether-extractable material.

This crude product is then functionally distilled under subatmospheric pressure to provide 16.5 g. of 2-ethyl-3-(1-acetoxyethyl) pyrazine.

A solution of 11.8 g. of the acetoxyethyl derivative in 75 cc. of methanol is added dropwise to 30 cc. of a 20% potassium hydroxide solution at room temperature. The addition requires about ten minutes, and the solution temperature rises above 10° C. to 34° C. The orange-yellow solution so obtained is stirred at room temperature for two hours.

The methanol is then stripped from the mixture under reduced pressure, and the remanent aqueous phase is extracted four times with 25 cc. portions of chloroform. The combined chloroform extracts are dried over magnesium sulfate, and the chloroform is evaporated to obtain 9.7 g. of crude alcohol product. Distillation of the crude alcohol under reduced pressure yields 7.1 g. of 2-ethyl-3-(1-hydroxyethyl) pyrazine as a clear, colorless liquid.

A mixture of 2.28 g. (0.015 M) of the distilled alcohol, 27 ml. of dimethyl sulfoxide, and 18 cc. of acetic anhydride is allowed to stand at room temperature for 24 hours, and is thereupon poured into 150 cc. of water. The diluted mixture is brought to an alkaline pH of 11–12 with ten percent aqueous potassium hydroxide.

The aqueous phase is extracted four times with 50 cc. portions of methylene chloride, the extracts are combined and dried over magnesium sulfate, and the solvent is stripped off. The residue is dissolved in 200 cc. of hexane, and the hexane solution is washed five times with 10 cc.

portions of water. The washed hexane solution is dried over magnesium sulfate, and the hexane is stripped off to obtain 1.75 g. of crude product containing about 60 percent 2-acetyl-3-ethylpyrazine. Infrared (IR) spectroscopy confirms the structure.

EXAMPLE III

Potato flavor

A potato flavoring material is prepared by admixing the following ingredients:

| Ingredient: | Amount (parts) |
| --- | --- |
| Diacetyl (1% solution) | 0.2 |
| Furfural | 0.2 |
| 2-acetyl-3-ethylpyrazine (1% solution) | 1.0 |
| 2-ethyl-3-methylpyrazine | 4.0 |
| Methional | 2.0 |
| Ethanol | 92.6 |

A 0.2 percent quantity of the foregoing flavoring composition is added to a cracker-type snack product dough and the product is baked conventionally. When compared with a cracker prepared in the same manner, but without the foregoing flavor composition, the product having the added flavor composition is found to have a good potato-like flavor character.

Amounts of the Example III flavoring composition are added to other snack products and various types of dried potatoes in amounts of from 0.005 percent to 2 percent of the finished product. In the case of the dehydrated potatoes, potato products reconstituted from the dried materials are found to have superior potato flavor. In the case of the snack foods, depending upon the nature of the original product, they either take on a positive potato flavor or else the pre-existing potato flavor is greatly enhanced.

What is claimed is:

1. 2-acetyl-3-ethylpyrazine.
2. A process for preparing a 2-acetyl-3-alkylpyrazine which comprises reacting 2-ethyl-3-alkyl-pyrazine with N-bromosuccinimide to produce 2-(1-haloethyl)-3-alkylpyrazine and then treating the haloethylalkylpyrazine with an alkali metal and 2-nitropropane to obtain 2-acetyl-3-alkylpyrazine, wherein the alkyl group is a lower alkyl containing from one to six carbon atoms.
3. A process according to claim 2 wherein the alkyl is ethyl.
4. A process according to claim 2 wherein the halo is bromo or chloro.
5. A process according to claim 2 wherein the reaction of the ethylalkylpyrazine is carried out at a temperature of from 25° to 85° C.
6. A process according to claim 2 wherein the reaction with the alkali metal is carried out at from 25° to 80° C.
7. A process according to claim 2 wherein the reaction to produce the haloethyl derivative is carried out in the presence of a strong oxidizing agent as a catalyst.

References Cited

UNITED STATES PATENTS

| 3,402,051 | 9/1968 | Roberts | 260—250 |
| 2,677,686 | 5/1954 | Smith et al. | 260—250 |

NICHOLAS S. RIZZO, Primary Examiner

U.S. Cl. X.R.

252—522; 99—140, 124